(12) United States Patent
Stallinga et al.

(10) Patent No.: US 6,933,999 B2
(45) Date of Patent: Aug. 23, 2005

(54) LIQUID CRYSTAL DISPLAY DEVICE

(75) Inventors: Sjoerd Stallinga, Eindhoven (NL); Peter Van De Witte, Heerlen (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 4 days.

(21) Appl. No.: 10/705,318

(22) Filed: Nov. 10, 2003

(65) Prior Publication Data

US 2004/0095533 A1 May 20, 2004

Related U.S. Application Data

(62) Division of application No. 09/787,249, filed as application No. PCT/EP00/06587 on Jul. 11, 2000, now Pat. No. 6,674,498.

(30) Foreign Application Priority Data

Jul. 16, 1999 (EP) .............................................. 99202351

(51) Int. Cl.$^7$ ...................... G02F 1/1347; G02F 1/1343
(52) U.S. Cl. ......................................... 349/144; 349/76
(58) Field of Search ............................ 349/74–76, 117, 349/129, 144

(56) References Cited

U.S. PATENT DOCUMENTS

| | | | | |
|---|---|---|---|---|
| 5,287,207 A | * | 2/1994 | Mulkens et al. | 349/76 |
| 5,473,455 A | * | 12/1995 | Koike et al. | 349/124 |
| 5,576,863 A | * | 11/1996 | Aoki et al. | 349/124 |
| 5,717,474 A | * | 2/1998 | Sarma | 349/85 |
| 5,726,723 A | * | 3/1998 | Wang et al. | 349/75 |
| 5,796,456 A | * | 8/1998 | Takatori et al. | 349/117 |
| 5,831,706 A | * | 11/1998 | Lyu | 349/129 |
| 5,877,831 A | * | 3/1999 | Leenhouts et al. | 349/113 |

* cited by examiner

*Primary Examiner*—Toan Ton

(57) ABSTRACT

In a normally black double cell, grey scale enhancement is obtained by dividing pixels in the driving cell into sub-pixels which are rotated preferably through 180° with respect to each other.

13 Claims, 5 Drawing Sheets

LIQUID CRYSTAL DISPLAY DEVICE

CROSS REFERENCE TO RELATED APPLICATIONS

Figure 1:
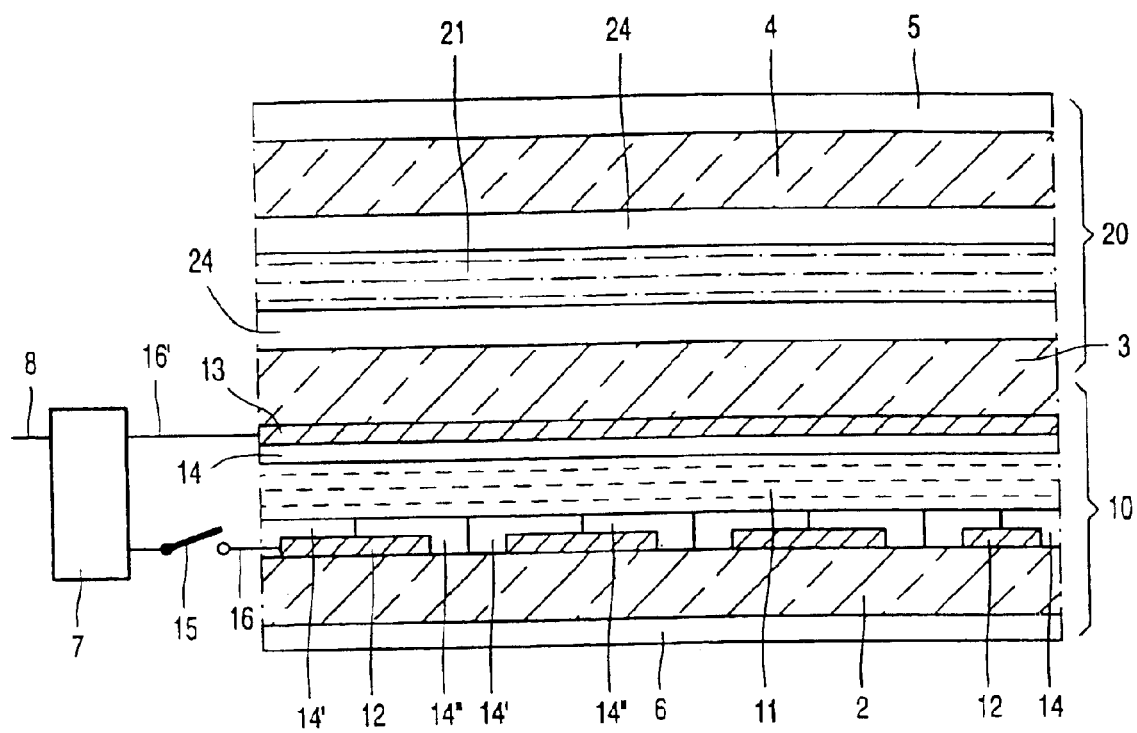

This is a divisional application Ser. No. 09/787,249, filed Mar. 16, 2001, now U.S. Pat. No. 6,674,498 which is a 371 of PCT/EP00/06587, filed Jul. 11, 2000.

The invention relates to a liquid crystal display device having, between a polarizer and an analyzer, a first layer of twisted liquid crystal material with a twisted structure between two transparent substrates, with pixels being realized between the substrates, and a compensator layer. Such display devices are generally used in, for example, automotive displays, but also in monitors, etc.

An example of such a display device is shown in, for example, U.S. Pat. No. 5,287,207. This patent shows a double cell in which a second cell functions as a compensator in order to obtain an optimum contrast. Although a satisfactory contrast is obtained in these types of display devices upon perpendicular passage of the light, it appears that there is a considerable grey scale inversion in such a double cell, when viewed at an angle.

It is, inter alia, an object of the present invention to reduce or eliminate said grey scale inversion.

To this end, a display device according to the invention is characterized in that a pixel comprises at least two sub-pixels having the same twist and, viewed transversely to the substrates, twist angles which are rotated with respect to each other. The twist angles, viewed transversely to the substrates, are rotated substantially 180 degrees with respect to each other. The effects on the grey scale of one sub-pixel are then compensated, as it were, by the effects of the other sub-pixel. Also in the case of rotations different from 180 degrees, an enhancement is obtained dependent on the type of usage (for example, in cockpit applications or in applications where a display device is viewed by different persons from two directions).

The twist angles are preferably in the range between 50 and 100 degrees.

A first preferred embodiment of a liquid crystal display device according to the invention is characterized in that the compensator layer has a twisted structure with a twist which is opposite to that of the layer of twisted liquid crystal material. The compensator layer preferably has a twist angle which is opposite to that of the layer of twisted liquid crystal material.

Further enhancements are possible by adding a retardation layer with an optical axis perpendicular to the compensator layer.

It is also possible to use negative birefringent materials such as discotic materials for the compensator layer.

These and other aspects of the invention are apparent from and will be elucidated with reference to the embodiments described hereinafter.

Figure 2:
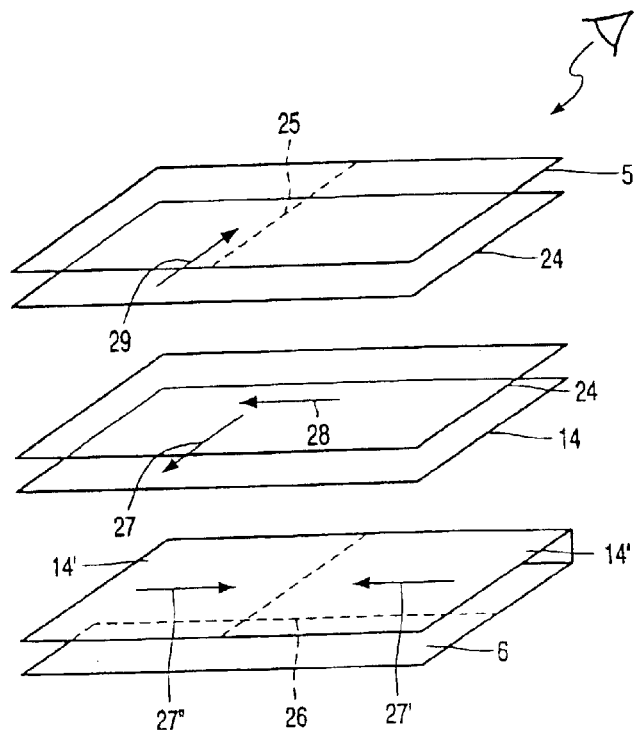
Figure 3:
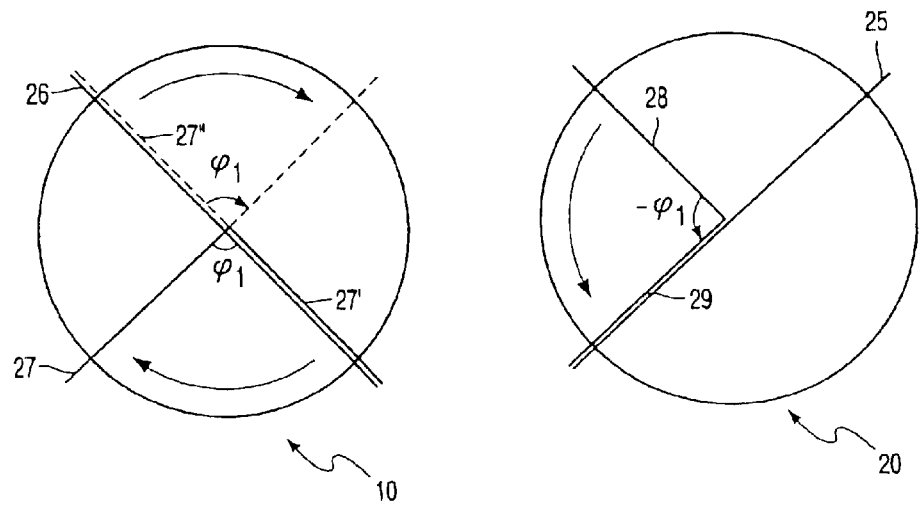
Figure 4:
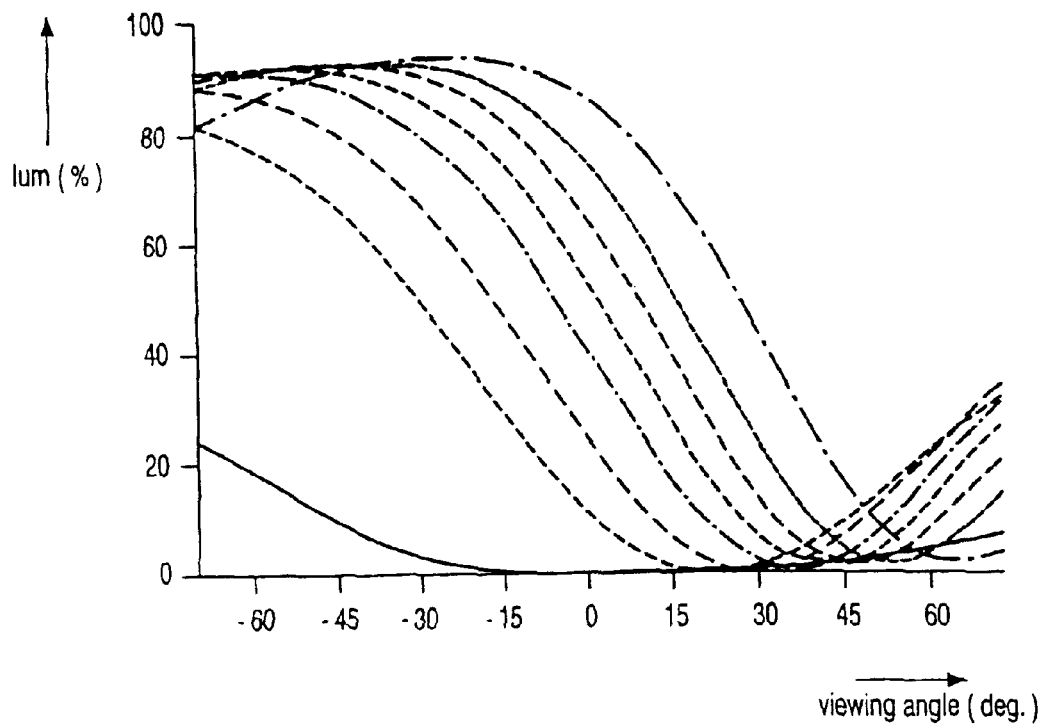
Figure 5:
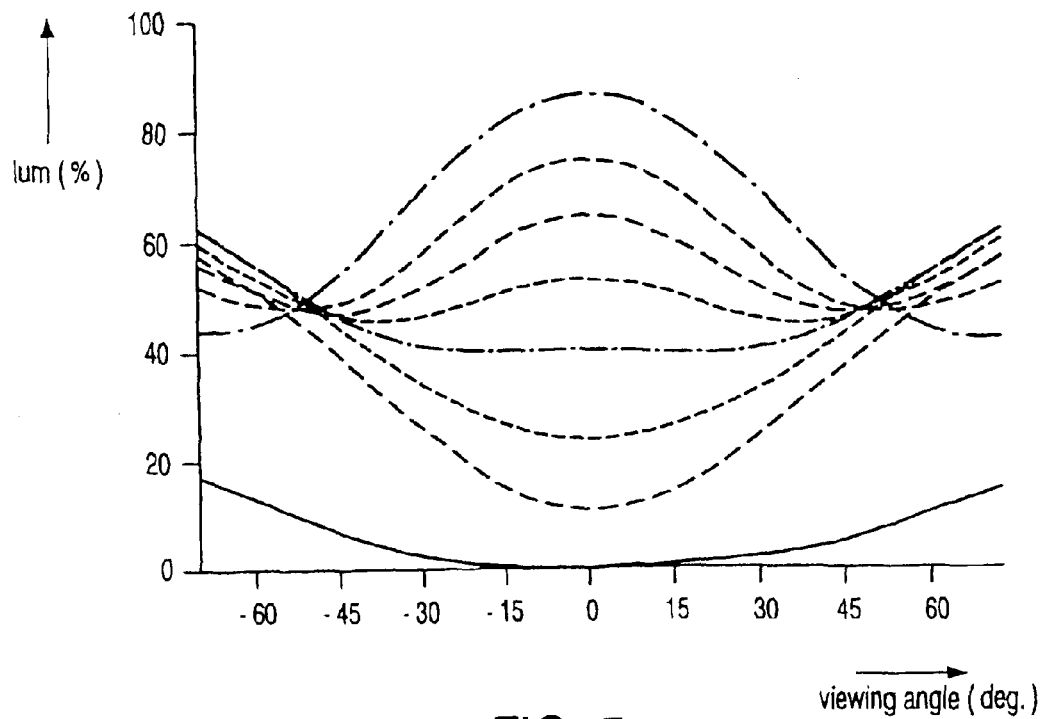
Figure 6:
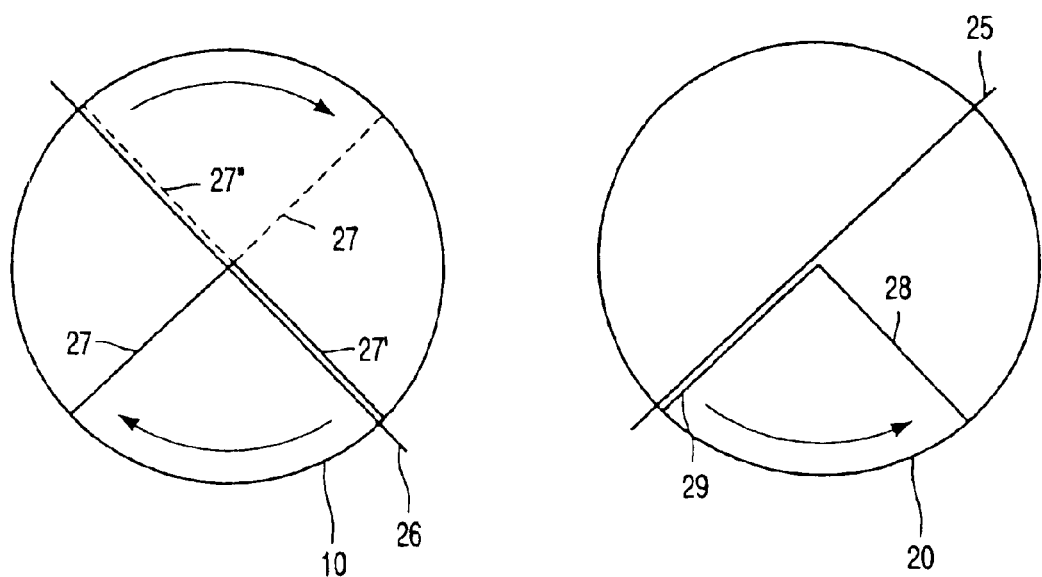
Figure 7:
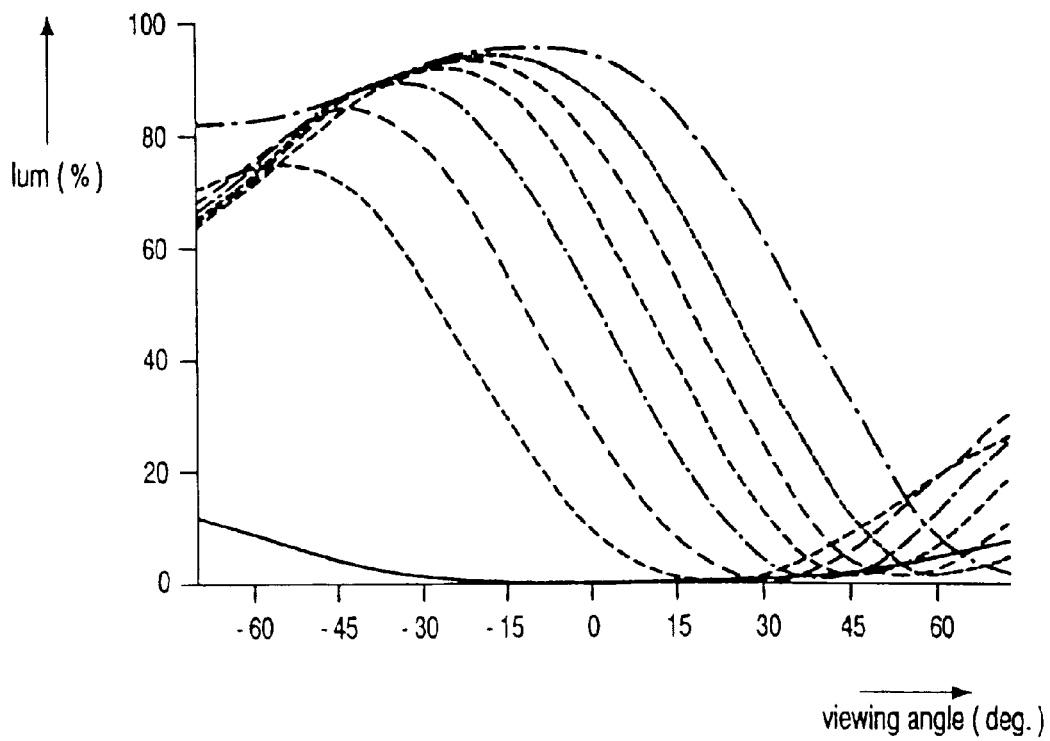
Figure 8:
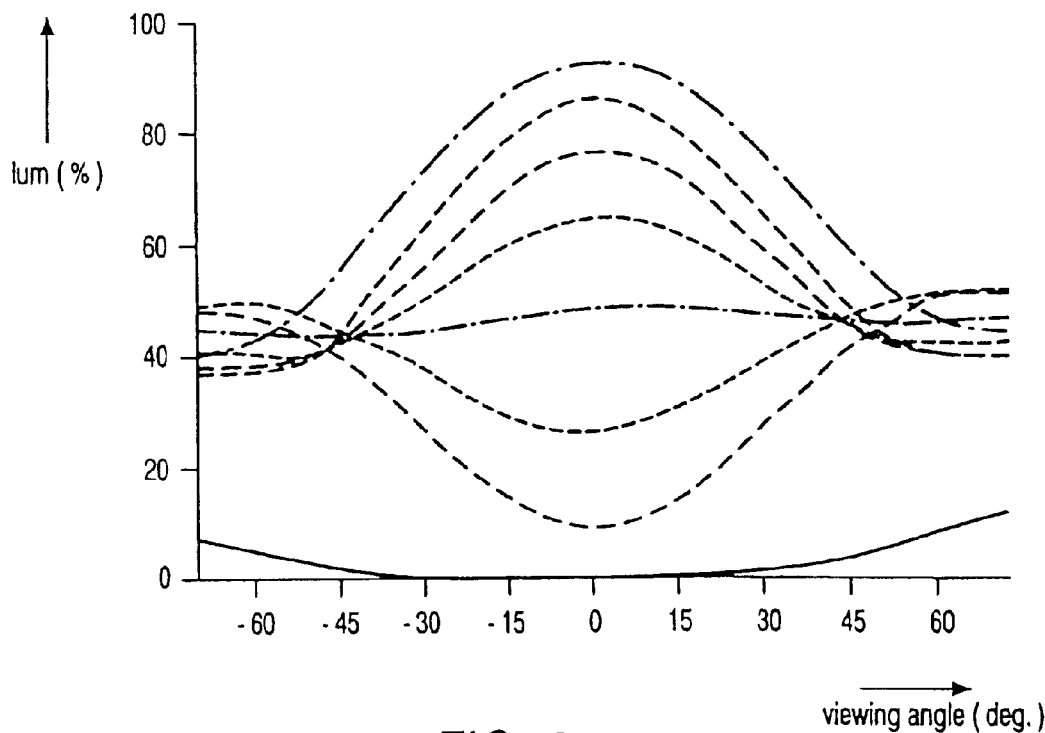

In the drawings:

FIG. 1 is a cross-section of a display device according to the invention,

FIG. 2 shows diagrammatically some parts of the display device according to the invention, FIG. 3 shows diagrammatically different orientation directions in the display device of FIG. 1, FIGS. 4 and 5 show the luminance as a function of the viewing angle for a double cell without using and using, respectively, the measure according to the invention, while FIG. 6 shows diagrammatically different orientation directions, and FIGS. 7 and 8 show the luminance again as a function of the viewing angle for a double cell in a display device with a compensation cell based on discotic material without using and using, respectively, the measure according to the invention.

The drawings are diagrammatic and not drawn to scale. Corresponding parts are generally denoted by the same reference numerals.

The display device of FIG. 1 comprises a first display cell 10 with a layer 11 of a liquid crystal material having a positive dielectric anisotropy between transparent supporting plates 2, 3. On the side of the liquid crystal material, electrodes 12, 13 defining, for example, a matrix of pixels are present on the supporting plates 2, 3. The pixels may be driven directly via row and column electrodes (positive drive). In this example, the pixels are defined by overlapping portions of picture electrodes 12 and a counter electrode 13, in which the picture electrodes are provided with pixel voltages by switching elements (not shown) via row and column electrodes (active drive). The drive voltages (selection and data signals) are obtained, for example, by means of a drive circuit 7 which converts incoming information 8 into said drive voltages which are applied to the electrodes 12, 13 via the switching elements (not shown) (here diagrammatically shown by means of switch 15 in one of the connection lines 16, 16'). Layers 14 of an insulating material, which in this example also serve as orienting layers, are present on the layers 12, 13. The layers 14 give the liquid crystal molecules a twist angle $\Phi_1$ at a voltage of 0 volt across the electrodes 12, 13. The twist angle $\Phi_1$ is between 50° and 100° and, in this example, 90°.

The device further comprises a compensator layer, in this example, a second cell 20 with a second layer 21 of a liquid crystal material having, in this example, also a positive dielectric anisotropy between two transparent supporting plates 3, 4. The supporting plate 3 is chosen to be common for both cells 10, 20, but this is not strictly necessary, although it simplifies the manufacture in which also the double cell maintains a small total thickness. Layers 24 for insulation and orientation are present on the supporting plates 3, 4. The liquid crystal material 21 and the orienting effect of the layers 24 are chosen to be such that the liquid crystal molecules acquire a twist angle $\Phi_2$ opposed to $\Phi_1$. The direction of orientation in this example is the same for the layers 14, 24. The cells 10 and 20 are situated between a polarizer 6 and an analyzer 5 whose directions of polarization are mutually crossed perpendicularly.

According to the invention, parts 14', of one orientation layer within a pixel are provided in such a way (for example, via masked rubbing or vapor deposition) that the direction of orientation is substantially 180° different for the liquid crystal molecules in the two sub-pixels. This is further shown in FIG. 2 in which the polarizer 6, parts 14', of an orientation layer on the supporting plate 2, the orientation layers 14, 24 on the supporting plate 3, the orientation layer 24 on the supporting plate 4 and the analyzer 5 are shown diagrammatically. The directions of orientation of the parts 14', of the orientation layer on the supporting plate 2, the orientation layers 14, 24 on the supporting plate 3 and the orientation layer 24 on the supporting plate 4 are denoted by the reference numerals 27', 27", 27, 28 and 29, respectively. The directions 27, 28 cross each other substantially perpendicularly.

The absorbing axis 26 of the polarizer 6 extends at an angle of 0° (180°) to the orientation direction 27' (27") in this example. Also other angles between the axis 26 and the direction 27 are possible. The wall orientation of the layers 14, 24 is chosen to be such that the director in the center of the cell 10 (at 0 volt) is perpendicular to the director in the center of the cell 20. Due to the division thus chosen, two twist angles $\Phi_1$ are introduced in sub-pixels of the cell 10, which angles, viewed transversely to the substrates, are rotated through substantially 180 degrees with respect to each other. This is shown diagrammatically in FIG. 3. The twist angles of the sub-pixels are determined by orientation directions 27', 27 and 27", 27 for the cell 10. In one sub-pixel, polarized light (polarized in the direction 26 of polarization of polarizer 6) is twisted through an angle $\Phi_1$ from direction 27' to direction 27 at 0 volt, and in the other sub-pixel from direction 27" to direction 27. In the second cell 20 (twist angle $-\Phi_1$), the directions of polarization for both sub-pixels are twisted back through the same angle from direction 28 (parallel to direction 27) to direction 29, so that it does not pass the analyzer 5 with the pass direction 25 (normally black).

For the grey scales as a function of the viewing angle of this double cell, it now holds that it is composed, as it were, from those of the two sub-pixels. Since these are symmetrically situated with respect to each other, a symmetrical characteristic is obtained. This is shown in FIGS. 4 and 5. FIG. 4 shows the characteristic curve of the luminance as a function of the viewing angle for a double cell without said measure (with a twist angle of 60° and d.$\Delta$n=330 nm) for different drive voltages. Grey scale inversion already starts at a viewing angle of 20° and occurs for all grey values. FIG. 5 shows this characteristic curve for a double cell, using said measure. Grey scale inversion now starts at viewing angles of more than 50° and then only for some grey values.

In the device shown diagrammatically in FIG. 6, the twist angle $\Phi_1$ of the cell 10 is 90° and d.$\Delta$n=400 nm. In this example, the second cell 20 has a second layer 21 of a liquid crystal material with a negative dielectric anisotropy. The orienting effect of the layers 24 is chosen to be such that the liquid crystal molecules acquire a twist angle of $-\Phi_1$. Such a cell 20 is obtained, for example, by choosing a discotic liquid crystalline material for the liquid material. In this example, the layer 21 is liquid but it may also consist of a polymerized liquid crystalline material. The orientation layers 24 are adapted in such a way that the directors of the discotic molecules acquire an orientation direction 28 at the area of substrate 3, transverse to the orientation direction 27 of the (calamatic) molecules at the area of substrate 3.

FIG. 7 shows for this double cell the luminance as a function of the viewing angle for a double cell comprising a compensation cell 20 which is based on a discotic material, without using said measure, and for different drive voltages, and FIG. 5 shows the characteristic curve for such a double cell, using the measure according to the invention.

The invention is of course not limited to the examples shown. For example, the compensation cell 20 may comprise a foil of polymerized liquid crystal with a twisted (director) structure instead of a liquid crystal material.

In summary, the invention yields an improvement of the grey scale in "normally black" double cells by dividing a pixel in the cell to be driven into sub-pixels which are rotated preferably through 180° with respect to each other.

The invention resides in each and every inventive characteristic feature and each and every combination of characteristic features.

What is claimed is:

1. A liquid crystal display device having, between a polarizer and an analyzer, a first layer of twisted liquid crystal material with a twisted structure between two transparent substrates, with pixels having at least two sub-pixels being realized between the substrates, and with a compensator layer operatively associated therewith, characterized in that at least two twist angles are introduced in the sub-pixels, which twist angles, viewed transversely to the substrates, are rotated similarly with respect to each other.

2. A liquid crystal display device as claimed in claim 1, characterized in that, the twist angles have a value of between 50° and 100°.

3. A liquid crystal display device as claimed in claim 1, characterized in that viewed transversely to the substrates, the twist angles are rotated through substantially 180° with respect to each other.

4. A liquid crystal display device as claimed in claim 1, characterized in that the compensator layer has a twisted structure with a twist which is opposite to that of the layer of twisted liquid crystal material.

5. A liquid crystal display device as claimed in claim 4, characterized in that the compensator layer has a twist angle which is opposite to that of the layer of twisted liquid crystal material.

6. A liquid crystal display device as claimed in claim 1, characterized in that the compensator layer comprises at least a retardation layer with an optical axis perpendicular to the compensator layer.

7. A liquid crystal display device as claimed in claim 1, characterized in that the compensator layer comprises a negative birefringent material.

8. A liquid crystal display device as claimed in claim 1, characterized in that the compensator layer comprises a liquid crystal material with a twisted structure.

9. A liquid crystal display device as claimed in claim 1, characterized in that the twist angles have substantially the same degree of twist.

10. A liquid crystal display device as claimed in claim 1, characterized in that a director in the center of the first layer of twisted liquid crystal material is substantially perpendicular to a director in the center of the compensator layer.

11. A liquid crystal display device as claimed in claim 1, characterized in that the twist angles of the sub-pixels are determined by orientation directions.

12. A liquid crystal display device as claimed in claim 11, characterized in that the orientation directions include a first direction, a second direction, and a third direction whereby in one sub-pixel, polarized light is twisted through a first angle from the first direction to the second direction at 0 volt, and in the other sub-pixel, from the third direction to the second direction.

13. A liquid crystal display device as claimed in claim 12, characterized in that in the compensator layer, directions of polarization for at least two sub-pixels associated therewith are twisted through the same angle in a direction opposite to that of the first angle from a direction substantially parallel to the second direction.

* * * * *